United States Patent [19]

Ohashi

[11] Patent Number: 4,668,139
[45] Date of Patent: May 26, 1987

[54] APPARATUS FOR IN SITU CHAMFERING MOTOR COMMUTATOR SEGMENTS

[75] Inventor: Sakuhei Ohashi, Amagasaki, Japan

[73] Assignee: Mitsubishi Denki Kabushiki Kaisha, Tokyo, Japan

[21] Appl. No.: 836,044

[22] Filed: Mar. 1, 1986

[30] Foreign Application Priority Data

Mar. 11, 1985 [JP] Japan .................. 60-46491

[51] Int. Cl.⁴ ............................................. B23D 3/02
[52] U.S. Cl. ................................... 409/302; 409/304
[58] Field of Search ............. 409/296, 293, 302, 303, 409/304

[56] References Cited

U.S. PATENT DOCUMENTS

| | | | |
|---|---|---|---|
| 2,263,870 | 11/1941 | Currie | 409/304 |
| 2,303,106 | 11/1942 | Baurhenn | 409/302 |
| 2,409,158 | 10/1946 | Simpson, Jr. et al. | 409/302 X |

FOREIGN PATENT DOCUMENTS

| | | | |
|---|---|---|---|
| 37291 | 3/1977 | Japan | 409/304 |
| 42714 | 3/1980 | Japan | 409/302 |

*Primary Examiner*—William R. Briggs
*Attorney, Agent, or Firm*—Sughrue, Mion, Zinn, Macpeak and Seas

[57] ABSTRACT

An apparatus for the in situ chamfering of DC motor commutator segments 1 separated by insulating spacers 2 is directly mountable on the motor yoke 62, and includes a frame 32 mounting a reversible drive motor 30 and slidably carrying a reciprocating work table 42. A cutter head 44 mounting a chamfering bit 45 is rotatably mounted to the work table by a pin 43 and is swung out of engagement with the commutator segment assembly 11 during each return pass of the work table, during which time the motor rotor is advanced one pitch by a worm driven roller 53.

15 Claims, 7 Drawing Figures

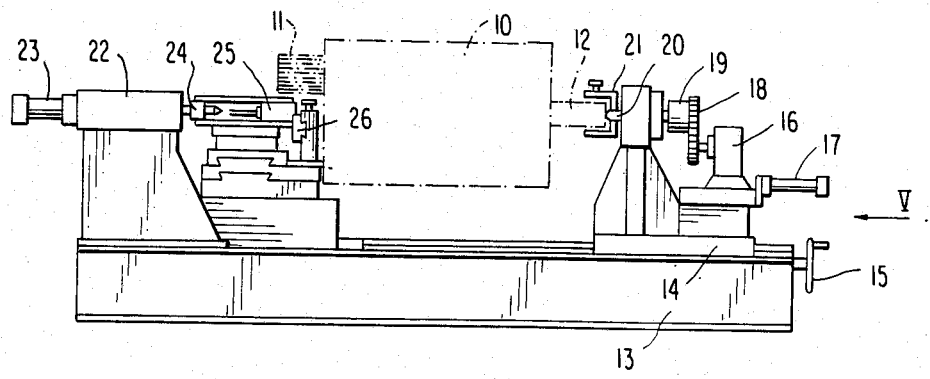

APPARATUS FOR IN SITU CHAMFERING MOTOR COMMUTATOR SEGMENTS

BACKGROUND OF THE INVENTION

This invention relates to a chamfering apparatus for commutators in general, and more particularly to such an apparatus for the maintenance of commutators of DC traction motors mounted on electric cars and/or electric locomotives.

Referring to FIGS. 1 to 3, part of a DC motor commutator is shown which includes commutator segments 1 and mica segments 2 which insulate the adjacent commutator segments 1 from each other. These segments 1 and 2 are disposed alternately around the circumference of a rotor shaft (not shown) and are fixed in place by clamps 3 and spiders 4. As illustrated in FIG. 3, the tops of the mica segments 2 are generally positioned lower than the tops of the commutator segments 1 by a distance "h", and the edges of the commutator segments are chamfered as shown by "c". Generally, commutator segments are chamfered manually using hand tools, or mechanically using special equipment, i.e., a chamfering apparatus for commutators.

FIGS. 4 and 5 illustrate a conventional chamfering apparatus, wherein a commutator assembly 11 is mounted on an armature 10 having a shaft 12. The opposite ends of the armature shaft 12 are supported by a chuck 20 and a rotary spindle 24 in the manner of a machining lathe. A clamping device 21 prevents the armature shaft from shifting laterally. The chuck 20 is secured to a support table 14. An indexing cylinder 17 indexes slots on the commutator assembly by rotating the chuck unit a predetermined amount through a reduction unit 16, transmission gears 18 and a clutch 19.

The indexing cylinder 17 is fixed to the support table 14 which is slidably mounted on a bed 13 and moved, by means of a handle 15, to adjust its position according to the length of the armature 10 to be machined. The spindle 24 is fixed to a tailstock 22 which is moved back and forth by means of a cylinder 23. A cutter bit holder 25 and an indexing stop 26 are fixed to a support table 27 which is mounted on a base 28 adjoining the bed 13. In operation, the ends of the armature shaft 12 are mounted between the chuck 20 and the spindle 24, and then the relative distance between the commutator assembly 11 and the cutter bit holder 25 is adjusted. The armature 10 is then rotated by the operation of the indexing cylinder 17, and is stopped at the positions that have been determined by the indexing stop 26.

After this indexing operation, the commutator segments are chamfered by the reciprocating movement of the cutter bit holder 25 parallel to the slots of the commutator assembly 11. This operation is repeated continuously from one segment to another, and is stopped automatically after the chamfering of all of the segments has been completed.

In such a conventional apparatus there are several disadvantages. In preparation for the chamfering operation it is necessary to remove the traction motors from the vehicle trucks, and then disassemble the motors to extract the armatures. After the chamfering operation, the reverse procedures have to be carried out. The size of the chamfering apparatus is also large because it must accommodate the installation of the entire armature body. Furthermore, it requires at least two drive devices, such as the cylinders 17 and 23, for both indexing and chamfering.

SUMMARY OF THE INVENTION

It is therefore an object of this invention to provide a new and improved commutator chamfering apparatus which is compact and able to chamfer the commutators without removing the traction motors from their vehicles and disassembling them.

This object is accomplished by mounting a chamfering apparatus on the yoke of a DC motor, such apparatus including a displaceable cutter head carrying a chamfering bit, and a reversible motor for driving the head back and forth in an axial direction to effect chamfering via a rack and pinion arrangement. A drive roller selectively engageable with the DC motor commutator is also provided for rotating the rotor during each return pass of the cutter head to successively index the commutator segments.

BRIEF DESCRIPTION OF THE DRAWINGS

In the accompanying drawings

FIG. 4 is a front view of a conventional chamfering apparatus for commutators;

FIG. 5 is a side elevation viewed in the direction of arrow V in FIG. 4;

DETAILED DESCRIPTION OF THE PREFERRED EMBODIMENTS

Figure 1:
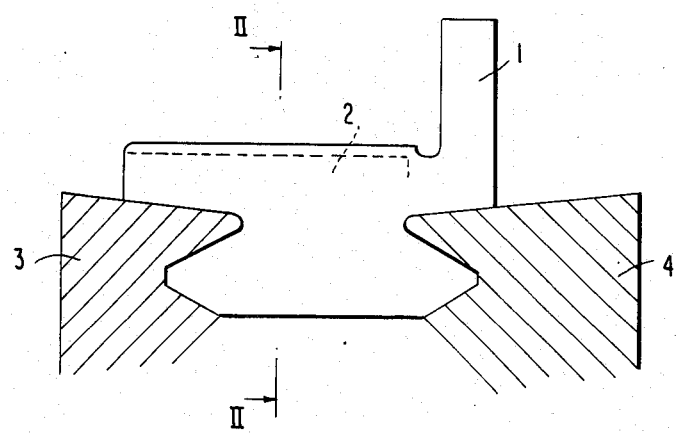
FIG. 1 is a partial cross sectional view of a commutator of a DC motor.
Figure 2:
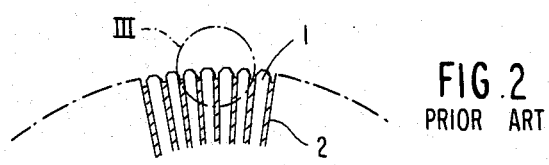
FIG. 2 is a cross sectional view taken along line II—II in FIG. 1.
Figure 3:
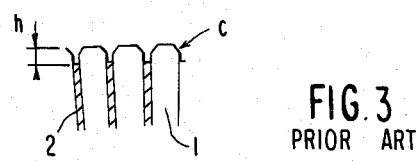
FIG. 3 is an enlarged view of circle III in FIG. 2.
Figure 6:
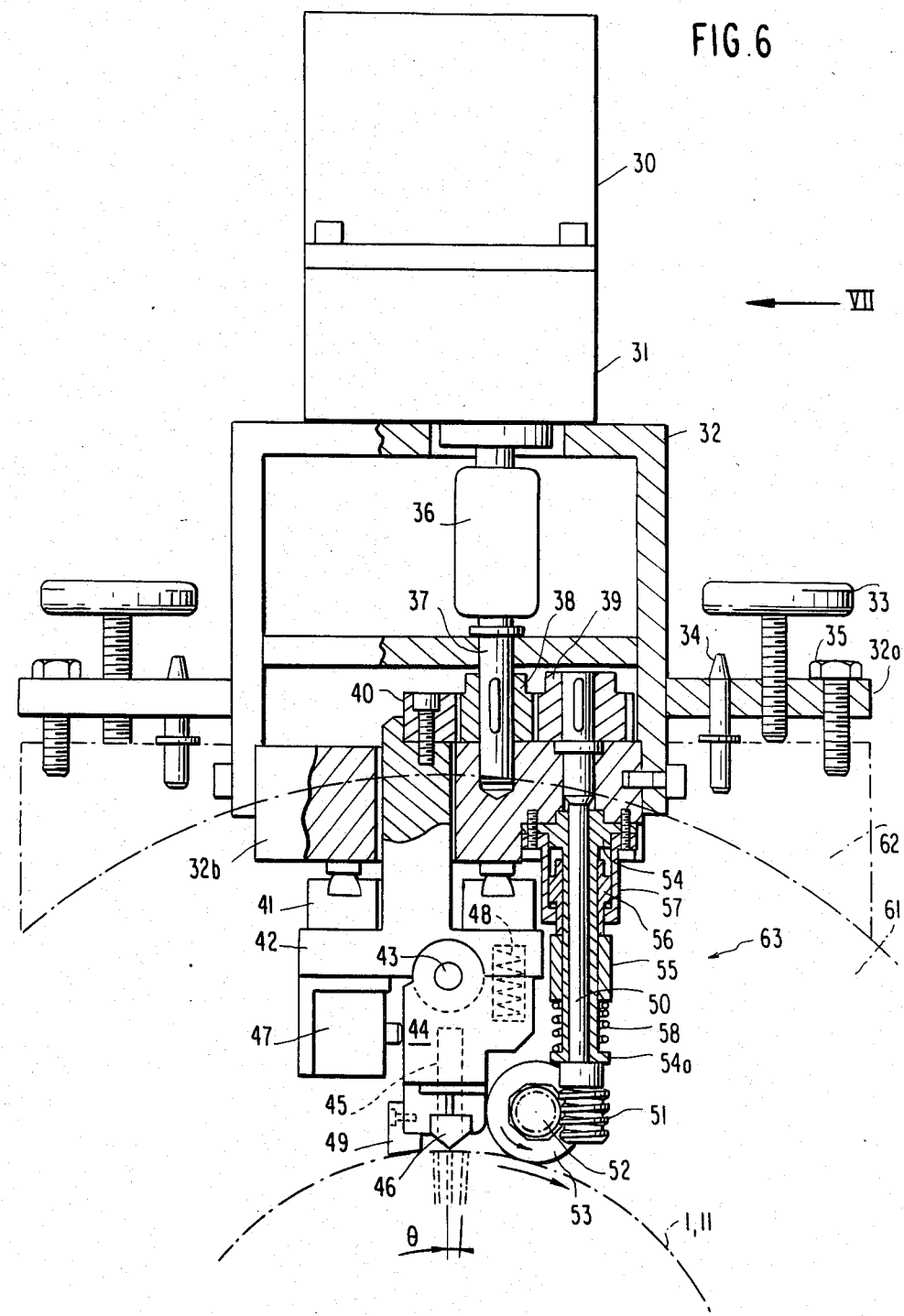
FIG. 6 is a front view, partly in cross section, of a chamfering apparatus for commutators according to a preferred embodiment of this invention.
Figure 7:
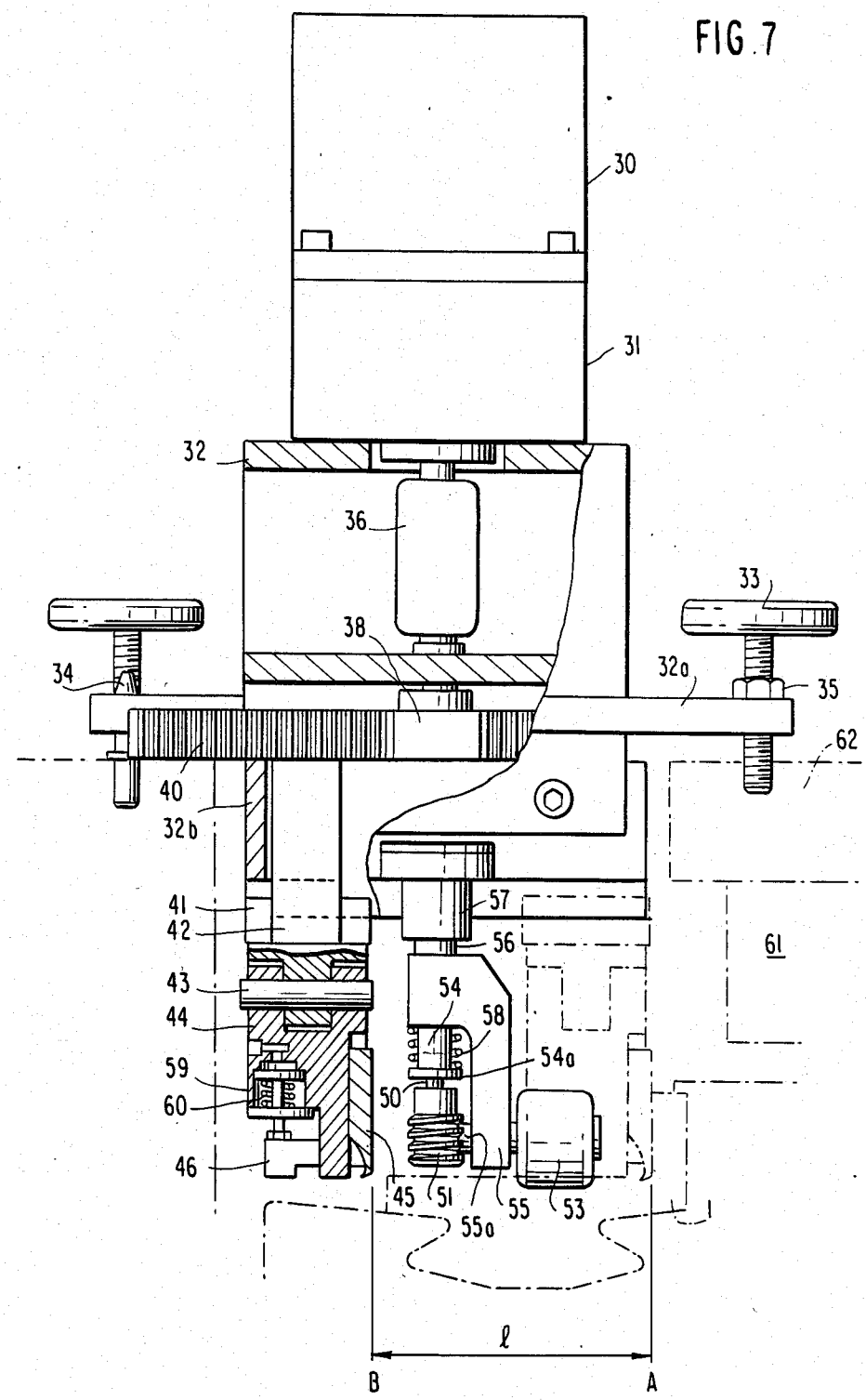
FIG. 7 is a side elevation, partly in cross section, viewed in the direction of arrow VII in FIG. 6.

FIGS. 6 and 7 illustrate a chamfering apparatus for commutators according to an embodiment of this invention, which is removably mounted on the yoke 62 of a DC motor housing 61. A reversible drive motor 30 and a reduction unit 31 are fixed to a frame 32 also mounting components including an attachment plate 32a, adjustment knobs 33, positioning pins 34 and mounting bolts 35.

The drive motor 30, through the reduction unit 31 and a coupling 36, is linked to a shaft 37 carrying a drive pinion 38 geared with a driven pinion 39 and a rack 40. A support table 32b is fixed to the frame 32, and the rack 40 is fixed to a work table 42 slidably mounted to the support table 32b through linear guides 41 which permit the reciprocating movement of the work table 42 parallel to the commutator segments 1.

A cutter head 44, including a cutter bit 45 and an indexing head 46, is rotatably supported on a pin 43 fixed to the work table 42. The cutter head 44 may be urged in a counterclockwise direction (in FIG. 6) by a working cylinder 47 fixed to the work table 42, against the clockwise bias of a spring 48 disposed between the table 42 and the cutter head. The indexing head 46 may be moved in the radial direction of the armature by a working cylinder 59 and a return spring 60. An abutment stop 49 is also fixed to the cutter head 44.

A shaft 50 is rotatably supported within a cylindrical sleeve 54 fixed to the support table 32b, and has the pinion 39 fixed to its upper end and a worm gear 51 fixed to its lower end. The pinion 39 is engaged with the drive pinion 38 as mentioned above. A worm wheel 52 that meshes with the worm gear 51 and a rotor advance roller 53 are interconnected by a shaft 55a which is rotatably mounted in a journal support 55. A rotor advance mechanism 63, composed of the journal support 55, a piston 56 and a cylinder 57, is coaxially mounted on the sleeve 54. A return spring 58 is disposed between the journal support 55 and a flange 54a on the lower end of the sleeve 54. When compressed air is supplied to the cylinder 57, the piston 56 is driven downwardly to push the journal support 55 and thus the roller 53, which may be rubber or the like, against the commutator segments 1. When the worm gear 51 is driven, the roller 53 turns and advances the commutator assembly 11 to sequentially index the commutator segments 1. When the compressed air is released the journal support 55 is raised up again by the spring 58 to lift the roller 53 from the commutator assembly. The abutment stop 49 is used to set the chamfering depth when the apparatus is installed on the motor. The position of the stop 49 is previously adjusted such that the commutator assembly 11 will be properly chamfered by the cutter bit 45 when the stop 49 engages the surface of the commutator assembly.

A chamfering operation using the apparatus described above will be now explained. The apparatus is first mounted on a DC motor to be chamfered, via the positioning pins 34 and the bolts 35. The knobs 33 are used to establish the proper vertical adjustment, whereafter the bolts 35 are tightened. The drive motor 30 is then rotated clockwise by a predetermined amount, and consequently the work table 42 moves a distance "1" from point A to point B as shown in FIG. 7, and the commutator segment 1 is chamfered by the cutter bit 45 fixed to the cutter head 44. The roller 53 is held separated from the commutator assembly 11 by the spring 58 during the chamfering operation.

The working cylinder 47 pushing the cutter head 44 counterclockwise is released when a sensor (not shown) detects the movement of the work table 42 to point B. The cutter head 44 is then rotated clockwise by the spring 48, which separates the cutter bit 45 and the indexing head 46 from the surface of the commutator assembly 11. The indexing head is also raised by the spring 60. When another sensor (also not shown) detects this clockwise rotation of the cutter head 44, the drive motor 30 starts to rotate counterclockwise. During such "return" rotation, the roller 53 is moved downwardly into engagement with the commutator assembly 11 by the cylinder 57 and piston 56. The duration of such engagement is preset such that the armature 10 is rotated by one pitch of the commutator segment 1 by the roller 53. The work table 42 is returned to point A from B by the counterclockwise rotation of the drive motor 30.

When an additional sensor (also not shown) detects the work table return to point A, the cutter head 44 is rotated to the chamfering position by the working cylinder 47. Following this, the indexing head 46 is moved downwardly into the gap between the adjacent commutator segments 1 by the cylinder 59. Since the counterclockwise rotation of the drive motor 30 is finished at that time, the commutator assembly 11 is easy rotatable because of disengaging from the roller 53 by the spring 58, and should be set to the right position for the next chamfering operation. If the indexing head 46 does not fit into the gap because of a large discrepancy in position, however, the apparatus will be stopped by a sensor which detects an insufficient descent of the indexing head 46, whereupon a corrective adjustment may be made. The indexing head 46 is returned upwardly after the indexing operation by spring 60. Then, the next chamfering operation will be initiated by the clockwise rotation of the drive motor 30. The commutator segments 1 are automatically chamfered in sequence by repeating the above operation. When all of the commutator segments have been chamfered, a counter (not shown) operates to stop the operation of the apparatus and signal the termination by an indicating device, e.g., a buzzer.

While a bidirectional drive motor 30 is used in the above described embodiment, hydraulic cylinders may also be employed.

What is claimed is:

1. An apparatus for the in situ chamfering of DC motor commutator segments, comprising:
   (a) frame means (32) stationarily mountable on a yoke (62) of a DC motor,
   (b) reversible drive means (30) stationarily mounted to the frame means,
   (c) cutter means including a cutter head (44) carrying a cutter bit (45),
   (d) a work table (42) movably mounting the cutter means and engaged with the drive means for linear reciprocation thereby in a direction parallel to a longitudinal axis of the motor,
   (e) means (47) mounted to the work table for moving the cutter means into engagement with a commutator segment assembly (11) of the motor during the movement of the work table in a first direction to effect the chamfering of two adjacent segments,
   (f) means (53) mounted to the frame means for incrementally rotating a rotor of the motor a distance corresponding to one pitch of the commutator segment assembly during the movement of the work table in a second, opposite direction, and
   (g) indexing means (46) mounted to the cutter means for engaging the commutator segment assembly to establish a precise centering of the cutter means relative to a gap between adjacent commutator segments.

2. An apparatus according to claim 1, further comprising linear guide means (41) slidably mounting the work table to the frame means, a pinion (38) driven by the drive means, and a rack (40) driven by the pinion and mounted to the work table.

3. An apparatus according to claim 2, wherein said indexing means includes a V-shaped head and is mounted to the cutter means for radial movement relative to the motor, and further comprising a first fluid cylinder and spring means (59, 60) for controlling said radial movement.

4. An apparatus according to claim 3, further comprising a pin (43) disposed parallel to the directions of movement of the work table for rotatably coupling the cutter head thereto.

5. An apparatus according to claim 4, wherein the means for moving the cutter means comprises a second fluid cylinder (47) and a return spring (48) disposed between the cutter means and the work table.

6. An apparatus according to claim 1, wherein said incremental rotation means comprises a roller mechanism including a roller (53) engageable with the commutator segment assembly, a transmission mechanism for transmitting rotational force from the drive means to the roller mechanism, and means for selectively engaging and disengaging the roller with the commutator segment assembly.

7. An apparatus according to claim 6, wherein said transmission mechanism includes a rotating shaft (50), a driven pinion (39) and a worm gear (51), said rotating shaft being rotatably supported in said frame means, said driven pinion being fixed to said rotating shaft and meshing with a drive pinion (38) rotated by said drive means, and said worm gear being fixed coaxially to said rotating shaft.

8. An apparatus according to claim 7, wherein said roller mechanism includes a worm wheel (52) meshing with said worm gear, and said roller is fixed coaxially to said worm wheel and driven thereby.

9. An apparatus according to claim 8, wherein said selective engagement and disengagement means includes a journal support (55) which rotatably supports said worm wheel, and a third fluid cylinder (57) disposed between said journal support and said frame means for selectively moving the roller into and out of contact with the commutator segment assembly.

10. An apparatus according to claim 9, wherein said third fluid cylinder coaxially surrounds said transmission mechanism shaft.

11. An apparatus according to claim 5, wherein said incremental rotation means comprises a roller mechanism including a roller (53) engageable with the commutator segment assembly, a transmission mechanism for transmitting rotational force from the drive means to the roller mechanism, and means for selectively engaging and disengaging the roller with the commutator segment assembly.

12. An apparatus according to claim 11, wherein said transmission mechanism includes a rotating shaft (50), a driven pinion (39) and a worm gear (51), said rotating shaft being rotatably supported in said frame means, said driven pinion being fixed to said rotating shaft and meshing with a drive pinion (38) rotated by said drive means, and said worm gear being fixed coaxially to said rotating shaft.

13. An apparatus according to claim 12, wherein said roller mechanism includes a worm wheel (52) meshing with said worm gear, and said roller is fixed coaxially to said worm wheel and driven thereby.

14. An apparatus according to claim 13, wherein said selective engagement and disengagement means includes a journal support (55) which rotatably supports said worm wheel, and a third fluid cylinder (57) disposed between said journal support and said frame means for selectively moving the roller into and out of contact with the commutator segment assembly.

15. An apparatus according to claim 14, wherein said third fluid cylinder coaxially surrounds said transmission mechanism shaft.

* * * * *